March 10, 1931. E. J. EICH 1,795,645
AUTOMOBILE CHOKE ACTUATED MECHANISM
Filed Aug. 2, 1929
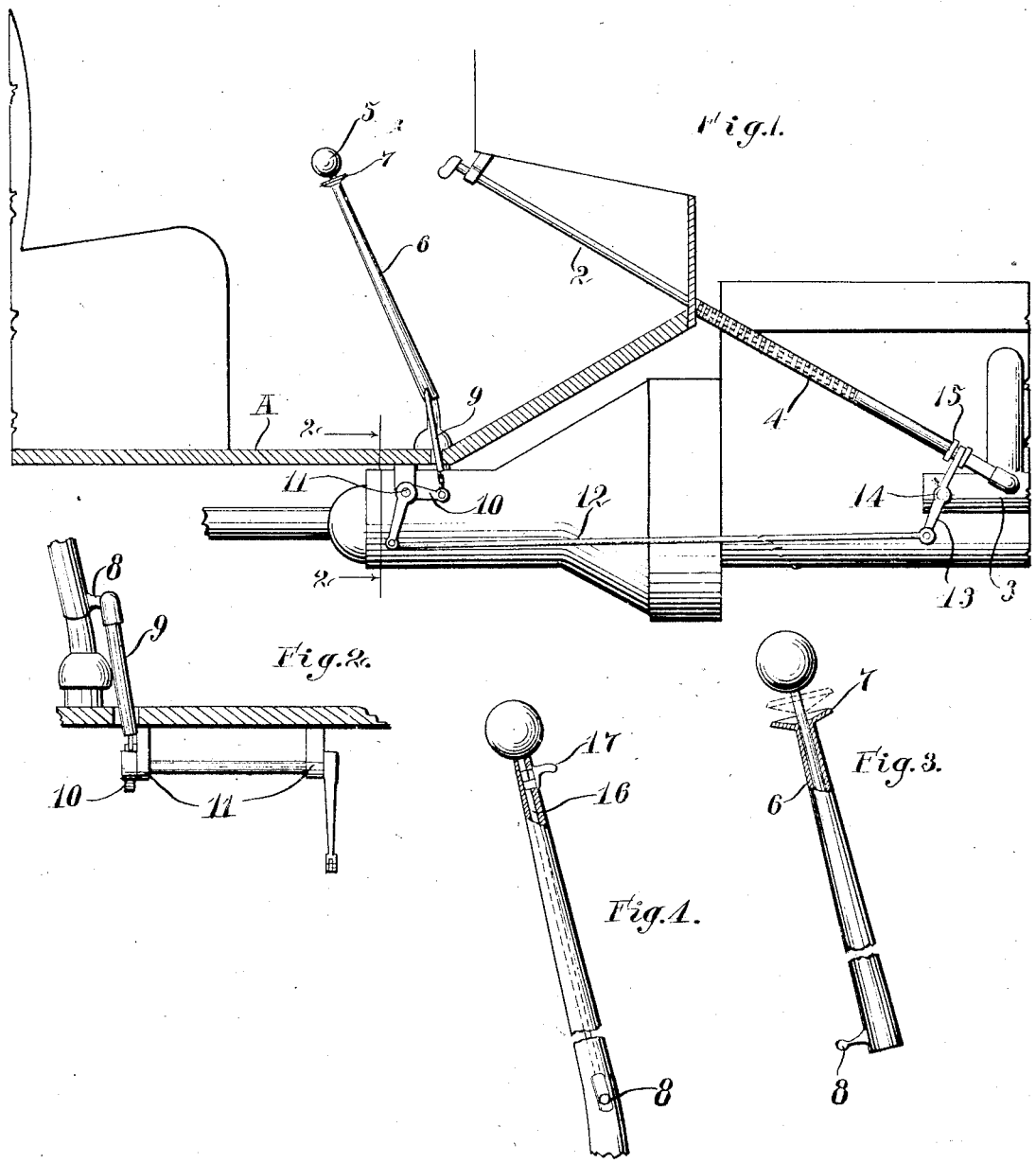
INVENTOR
Edward J. Eich
BY
ATTORNEY Patented Mar. 10, 1931

1,795,645

UNITED STATES PATENT OFFICE

EDWARD J. EICH, OF SHETEK, MINNESOTA

AUTOMOBILE CHOKE-ACTUATED MECHANISM

Application filed August 2, 1929. Serial No. 383,082.

My invention relates to improvements for controlling the choke rod on automobiles.

In some automobiles, a choke rod is so positioned that it is somewhat difficult for the driver to effectively handle the choke rod on account of the driver's position in relation to the gear control lever, and, in my invention, I provide means associated with the gear control lever, and particularly convenient for the driver in controlling the car.

These and other features of the invention will be more particularly pointed out and described in the following description and the accompanying drawings, wherein:

Figure 1 is a longitudinal vertical section through a portion of an automobile alongside the choke rod and gear shift lever.

Figure 2 is a sectional view on line 2—2 of Figure 1.

Figure 3 is a detail view of a gear shift lever and associated choke rod mechanism, shown partly broken away; and Figure 4 is a view similar to Figure 3, showing a slightly modified construction.

Referring to the drawings in detail, A represents the body of an ordinary automobile, 2 indicates the ordinary choke rod supported in connection with the dashboard and extending through the same to the carburettor mechanism 3 to control the choking in the ordinary manner. The choke rod is operated against the usual tension spring 4. At 5 is indicated the ordinary gear shift lever.

In carrying out my invention, I provide the following mechanism: Slidably supported upon the gear shift lever is a sleeve 6 having a flange 7 at its upper end for hand engagement. The lower end of the sleeve 6 is formed with a lateral arm 8 connected by a link 9, with the upper arm of a bell crank lever 10. The bell crank lever 10 has suitable pivotal support 11 underneath the floor of the car. The lower arm of the bell crank lever 10 is connected by a rod 12 to the lower end of a substantially straight lever arm 13. The lever arm 13 has central pivotal support 14, the upper end of the lever arm 13 loosely fitting between the ring flanges 15 around the lower end of the choke rod.

Figure 4 illustrates a slightly modified construction adapted for use in connection with a hollow form of gear shifting lever. In the form shown in Figure 4, a rod 16 is substituted for the sleeve 6, a finger hold 17 being carried by the upper end of the rod 16. In the use of the form shown in Figure 4, the rod 16 is connected with the choke rod and acts the same as the sleeve 6 in the form shown in Figure 3.

In use, where it is desired to actuate the choke rod, against the tension of the spring 4, the driver simply pulls up the sleeve 6 or the rod 16, as the case may be, turning the bell crank lever 10 to push the rod 12 forward and through the lever arm 14 push the choke rod 2 outwardly against the tension of the spring 4 to perform the ordinary operation of choking, as in starting a car. As soon as the pressure is relieved upon the sleeve 6 or rod 16, as the case may be, the spring 4 will return the choke rod in the ordinary manner to a normal position. In the use of my invention it is not, therefore, necessary for the driver to directly manipulate the choke rod 2, but said rod is entirely manipulated by the action of the sleeve 6 or rod 16 arranged in connection with the gear shift lever. This is a matter of great convenience to the driver, with the parts as they are in connection with the ordinary automobile.

I claim:

In an automobile, in combination with the usual choke rod and gear shift lever, a slidable hand actuated member supported by the gear shift lever, a bell crank lever supported below the gear shift lever, a link connection between one arm of said lever and said slidable member, an actuating lever arm arranged in connection with the lower end of the choke rod, a rod connecting the arm of said bell crank lever opposite the gear shift lever with the lever arm arranged in connection with the choke rod, in the manner and for the purpose set forth.

In testimony whereof I affix my signature.

EDWARD J. EICH.